(12) United States Patent (10) Patent No.: US 11,904,666 B2
Schwartz et al. (45) Date of Patent: Feb. 20, 2024

(54) CAMERA-BASED VEHICLE SUNLOAD MAPPING

(71) Applicant: FORD GLOBAL TECHNOLOGIES, LLC, Dearborn, MI (US)

(72) Inventors: Jake S. Schwartz, Dearborn, MI (US); Nicholas A. Scheufler, Flat Rock, MI (US); Jonathan Diedrich, Carleton, MI (US); Eric R. Krieger, Canton, MI (US); Mark Gehrke, Ypsilanti, MI (US); Martin van Hoeckel, Woodstock (CA); Brian Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 452 days.

(21) Appl. No.: 17/335,217

(22) Filed: Jun. 1, 2021

(65) Prior Publication Data

US 2022/0379691 A1 Dec. 1, 2022

(51) Int. Cl.
*G01J 1/42* (2006.01)
*B60J 3/04* (2006.01)
*G01J 1/04* (2006.01)

(52) U.S. Cl.
CPC ............ *B60J 3/04* (2013.01); *G01J 1/0422* (2013.01); *G01J 1/4204* (2013.01)

(58) Field of Classification Search
CPC .......... G01J 1/0422; G01J 1/4204; G01J 2001/4266; B60H 1/00207; B60J 3/04
See application file for complete search history.

(56) References Cited

U.S. PATENT DOCUMENTS 7,275,983 B2 * 10/2007 Aoki .................... B60H 1/0075
454/75
10,562,379 B2 2/2020 Ghannam et al.
(Continued)

FOREIGN PATENT DOCUMENTS

| EP | 3144648 A2 | 3/2017 |
| JP | 4645353 B2 | 3/2011 |
| JP | 5152019 B2 | 2/2013 |

OTHER PUBLICATIONS

Texas Instrument, Datasheet for OPT3001-Q1 Ambient Light Sensor (ALS), Dec. 2018.

*Primary Examiner* — Kevin K Pyo
(74) *Attorney, Agent, or Firm* — Frank L. Lollo; MacMillan, Sobanski & Todd, LLC

(57) ABSTRACT

A vehicle characterizes a sunload on the vehicle using an imaging system including at least one camera capturing image data (e.g., without using an ambient light sensor). The image data includes at least a portion of a passenger cabin. A region of interest (ROI) overlay receives the image data and extracts selected image data according to predetermined scene elements of the vehicle environment. An occupant overlay is configured to detect a vehicle occupant represented in the selected image data and configured to generate truncated image data by subtracting image data corresponding to the vehicle occupant from the selected image data. An ambient light model uses environmental parameters including a sun position to estimate an expected sunload range. A mapper generates a sunload map comprising respective sunload values for a plurality of locations on the vehicle according to the truncated image data and the expected sunload range.

20 Claims, 4 Drawing Sheets

(56) References Cited

U.S. PATENT DOCUMENTS

| | | | |
|---|---|---|---|
| 2015/0261219 A1* | 9/2015 | Cuddihy | B60J 3/04 |
| | | | 701/23 |
| 2020/0293773 A1 | 9/2020 | Loveland et al. | |

\* cited by examiner

CAMERA-BASED VEHICLE SUNLOAD MAPPING

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to determining a sunload irradiating a motor vehicle, and, more specifically, to determining sunload using cameras placed on a vehicle primarily for other monitoring functions.

It is known to use a sunload sensor in passenger vehicles to determine an irradiance or amount of sunlight reaching the driver and passenger. Quantifying the sunload can be used to improve performance of various vehicle systems. For example, headlamps and other exterior lighting may be automatically activated when ambient light falls below a threshold. An HVAC control may be adjusted according to sunload since a driver/passenger in full sun may benefit from additional cooling from the HVAC. Face detection and face recognition features such as pattern recognition algorithms used to detect a gazing direction of the driver can use sunload to adjust exposure time or adjust image properties to better identify important features in the images. Illuminated displays and gauges can use sunload to increase brightness on a touchscreen panel is bright sunlight for better visibility. Sunload can also be used by autonomous vehicles which have exterior displays (e.g., driverless taxis which display status messages on the exterior surfaces) to control brightness in order to optimize visibility.

Sunload is typically determined using a dedicated sensor, such as an ambient light sensor (ALS). An ALS has a wide field of view (e.g., about 110° or more) and is configured to detect a light intensity (e.g., which may be averaged over the field of view). A single sensor is usually deployed on a vehicle dashboard just behind the windshield. Consequently, there may be only a single sunload measurement available. For some functions, such as HVAC control, it is desirable to determine sunloads for several specific locations in a passenger cabin.

Installations of visible light cameras on vehicles are commonplace, e.g., for performing various functions such as providing backup views on a display screen, monitoring lane position while driving, performing obstacle detection, and others. Interior cameras have been used for monitoring driver and passenger status, while exterior cameras have been used for backup assist and 360° surround views. Even though the image data captured by onboard cameras (interior and/or exterior) may depend on reflected solar radiation, they have not replaced the ALS sensor because the image data does not have a simple correlation with the direct solar radiation or the average ambient light. Intensity data is provided for individual pixels, and there would be no consistent way of averaging intensities of all the pixels in order to derive a sunload. The color and reflectivity of objects and/or any shadows that coincidentally appear in the captured images can have an unknown impact on the average image brightness, preventing a reliable determination of sunload.

SUMMARY OF THE INVENTION

The present invention processes image data collected from one or more cameras in a way that avoids the shortcomings mentioned above, and enables a sunload to be determined without needing an ambient light sensor.

In one aspect of the invention, apparatus for a vehicle with a passenger cabin comprises an imaging system including at least one camera capturing image data. The image data includes at least a portion of the passenger cabin. A region of interest (ROI) overlay receives the image data and extracts selected image data according to predetermined scene elements of an environment of the vehicle. An occupant overlay is configured to detect a vehicle occupant represented in the selected image data and configured to generate truncated image data by subtracting image data corresponding to the vehicle occupant from the selected image data. An ambient light model uses environmental parameters including a sun position to estimate an expected sunload range. A mapper generates a sunload map comprising respective sunload values for a plurality of locations on the vehicle according to the truncated image data and the expected sunload range.

DETAILED DESCRIPTION OF PREFERRED EMBODIMENTS

Figure 1:
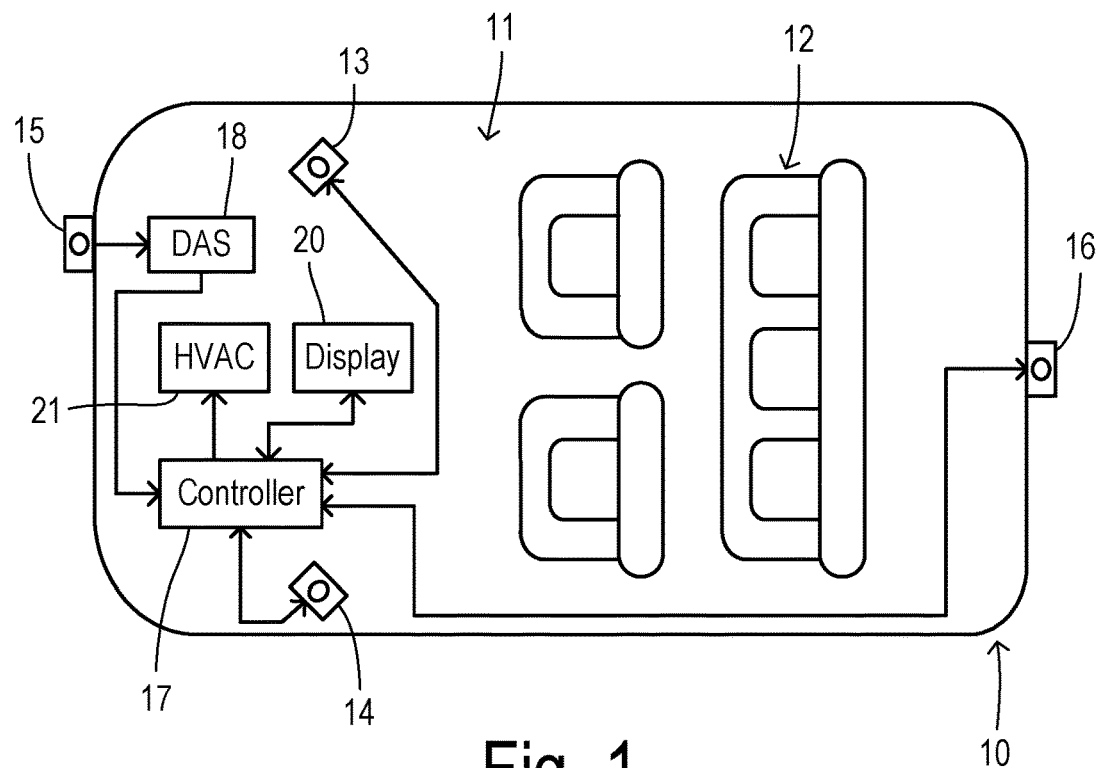
FIG. 1 is a block diagram showing one embodiment of a vehicle according to the present invention.

Referring to FIG. 1, a vehicle 10 has a passenger cabin 11 including passenger seating 12. An imaging system includes interior cameras 13 and 14 and exterior cameras 15 and 16 each capturing respective image data according to their respective fields of view. Interior cameras 13 and 14 may have a primary use in a driver monitoring system for facial detection and recognition, for example. Exterior camera 16 may be part of a backup monitoring system. Cameras 13-16 are coupled with a sunload controller 17 either directly or indirectly. For example, exterior camera 15 is coupled to a driver assistance system 18 which is coupled to controller 17 (e.g., by an onboard multiplex network such as a CAN bus). Cameras 13-16 collectively provide image data covering at least a portion of passenger cabin 11. In some embodiments, a single camera may be sufficient. The image data preferably includes both an external environment and an internal environment which are exposed to an ambient sunload. Controller 17 is further coupled to a human-machine interface (HMI) display 20 and to an HVAC system 21 to broadcast sunload values to be used in modifying their operation (e.g., adjusting HVAC cooling in view of a high sunload on a person, or increasing brightness of a display for better visibility in a well-lit area).

The invention may generate a sunload map which provides a sunload profile across the vehicle cabin (and which may also include the vehicle exterior) based on images from existing interior and exterior facing cameras. By leveraging multiple cameras (where available), multiple looks of the scene can be obtained, thereby potentially improving accuracy of the estimated sunload map. Determination of the estimated sunload map may be comprised of two main components, a measured ambient light and an expected ambient light. The measured ambient light is based on extracting features of the image data from the camera(s), optionally including corrections based on known or inferred properties of the object(s) being imaged. The expected ambient light is based on environmental/situational parameters which may provide an expected range for the actual ambient light for use in validating the measured values. In particular, accuracy of sunload estimates which are based on camera image data may be more challenging under high sunload conditions (e.g., a sunny day). The expected range may be determined using information such as sun angle, local weather predictions, and sun obstructions.

Figure 2:
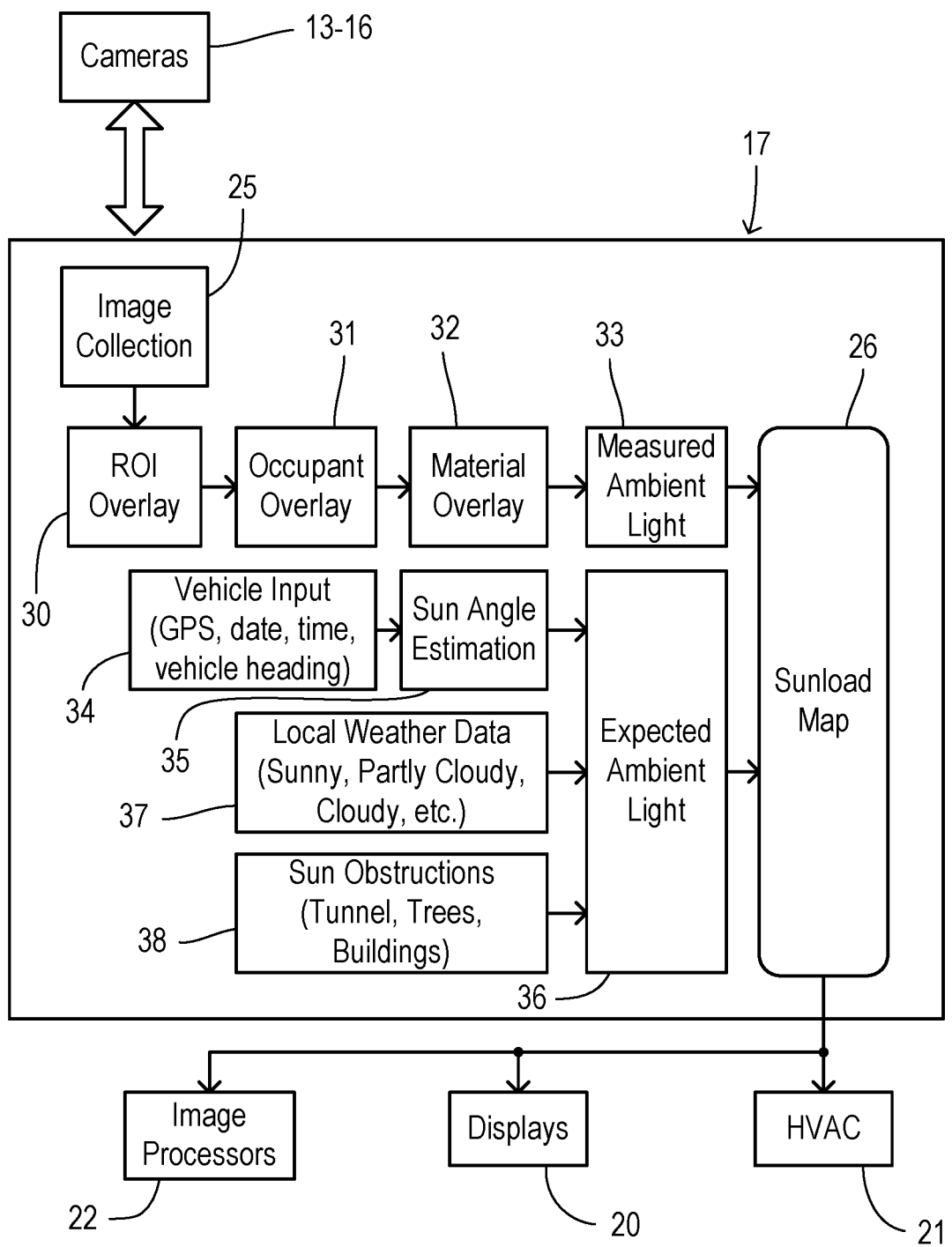
FIG. 2 is a block diagram showing one embodiment of a camera-based sunload detection system in greater detail.

As shown in FIG. 2, image data representing a measured ambient light may be processed according to a plurality of overlays to help mitigate scene and image noises. The overlays may be comprised of predefined filters that are calibrated according to each unique car model. Thus, controller 17 includes an image collection block that receives image data from cameras 13-16. Aggregated image data from block 25 is applied to a region-of-interest (ROI) overlay 30, followed by an occupant overlay 31, and a material overlay 32 which outputs measured ambient light values to an array (e.g., memory) 33. The overlays may act as filters that truncate image data and/or provide intensity corrections as described below. An expected ambient light block 36 receives environmental parameters, including a sun position (e.g., a sun angle and altitude or azimuth) based on vehicle inputs 34 (e.g., a date, time, and vehicle heading as determined using a GPS navigation system). A sun angle estimator 35 may include an ephemeris or almanac with relates the time and vehicle heading information to an apparent position of the sun in the sky. Environmental parameters received by expected ambient light block 36 may further include 1) local weather data (e.g., whether the conditions are sunny or partly cloudy) that may be obtained via a wireless data connection, and 2) identification of potential solar obstructions (e.g., tunnels, trees, or buildings) that might cast shadows impacting the image data. The measured ambient light and expected ambient light are combined in a processing block 26 that generates a sunload map comprising respective sunload values for a plurality of locations on the vehicle (e.g., inside the passenger cabin) according to the filtered (e.g., truncated) image data and the expected sunload range. Locations represented in a sunload map may correspond to seating locations for which various other systems are to be adjusted according to the sunload experienced by persons in the seating locations. For example, display screen 20 visible from the seat location may have an automatic brightness adjustment responsive to the sunload, and an airflow zone of an HVAC 21 serving the seating location may have an automatic temperature or blower adjustment response to the sunload. Image processors 22 operating on image data in support of other vehicle functions (e.g., driver monitoring) may receive the sunload map values to improve their performance based on knowledge of the ambient light (sunload) values.

ROI overlay 30 receives the image data and may preferably be configured to extract selected image data according to predetermined scene elements of an environment of (e.g., in and around) the vehicle. The scene elements are selected in order to reduce scene variation (e.g., choosing image regions most likely to be free of transient objects in at least in some use cases of the vehicle, such as when particular seats are unoccupied). In some instances, the chosen scene elements may also include surfaces with reflective properties that best assist in measuring the sunload. In the invention, sunload values can be estimated by the amount of ambient light sensed by camera(s) by measuring camera exposure time or pixel intensity. Normally, these measurements are scene dependent. For example, a white semi-trailer in the vicinity could flood the image with white pixels producing an artificially high ambient light reading. Limiting the image data according to ROI overlay 30 mitigates such noises by eliminating pixels that are most influenced by such transients. By focusing the processing on just certain areas of interest reduces overall scene variations and helps avoid imaging of surfaces having unknown optical properties (e.g., made of unknown surface materials). Additionally, ROI overlay 30 decreases the computational load by only using a subset of the full image data of all cameras.

Figure 3:
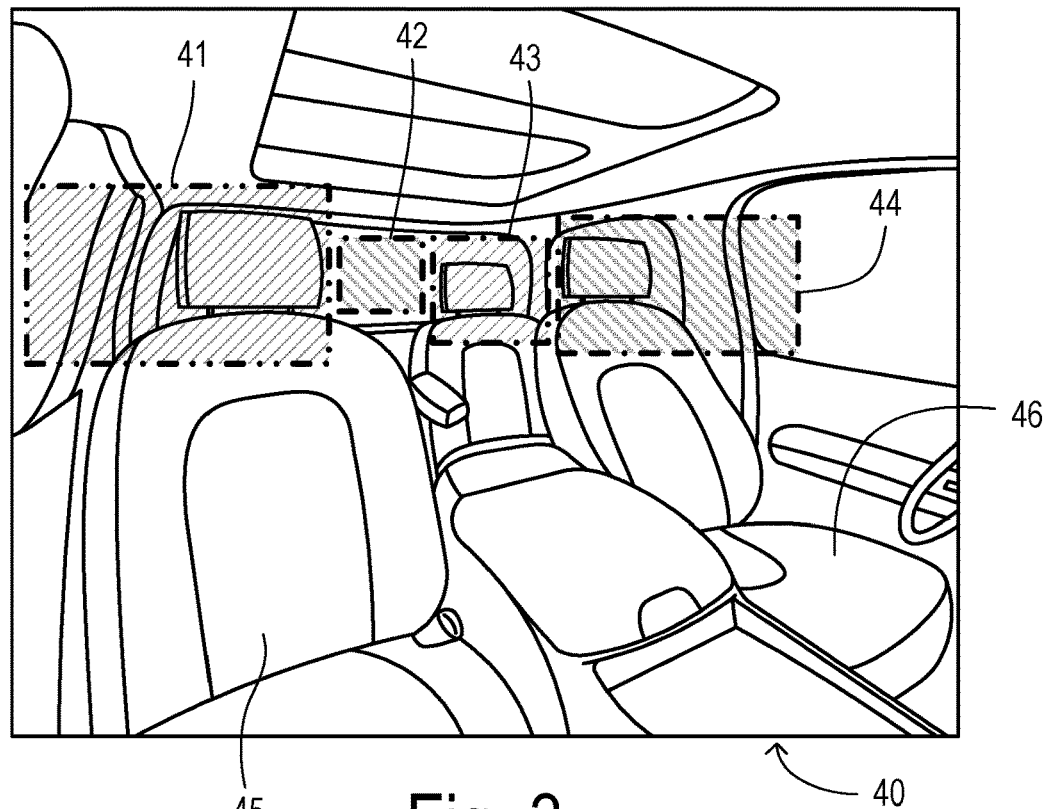
FIG. 3 schematically depicts a camera view within a vehicle passenger cabin with ROI overlays.

FIG. 3 shows an example of an ROI overlay on a frame of image data 40 from one particular camera. Additional ROI overlays may be defined with respect to image data from other cameras. Alternatively, an aggregated image can be stitched together from a plurality of cameras and then an ROI overlay can be placed over the aggregated image. For image data 40, the ROI overlay is comprised of overlay regions 41, 42, 43, and 44 which delineate scene elements (in the internal or external environment) providing the most consistent brightness response according to the ambient light levels. For example, ROI overlay region 41 may include portions of an interior vehicle trim panel, of a passenger seat 45, of a passenger cabin ceiling, and exterior views through window glass toward a rear of the vehicle. ROI overlay region 42 may include a view through a rear window, while ROI overlay region 43 includes portions of a rear seat, a vehicle trim panel, and an outside view. ROI overlay region 44 may include portions of an interior vehicle trim panel, of a driver seat 46, and exterior views through window glass toward a rear and side of the vehicle. As explained below, at least some of the scene elements in the ROI overlay may preferably be associated with predetermined material properties which can be applied to the exposure time/pixel intensity measurements to generate corresponding sunload values.

Figure 4:
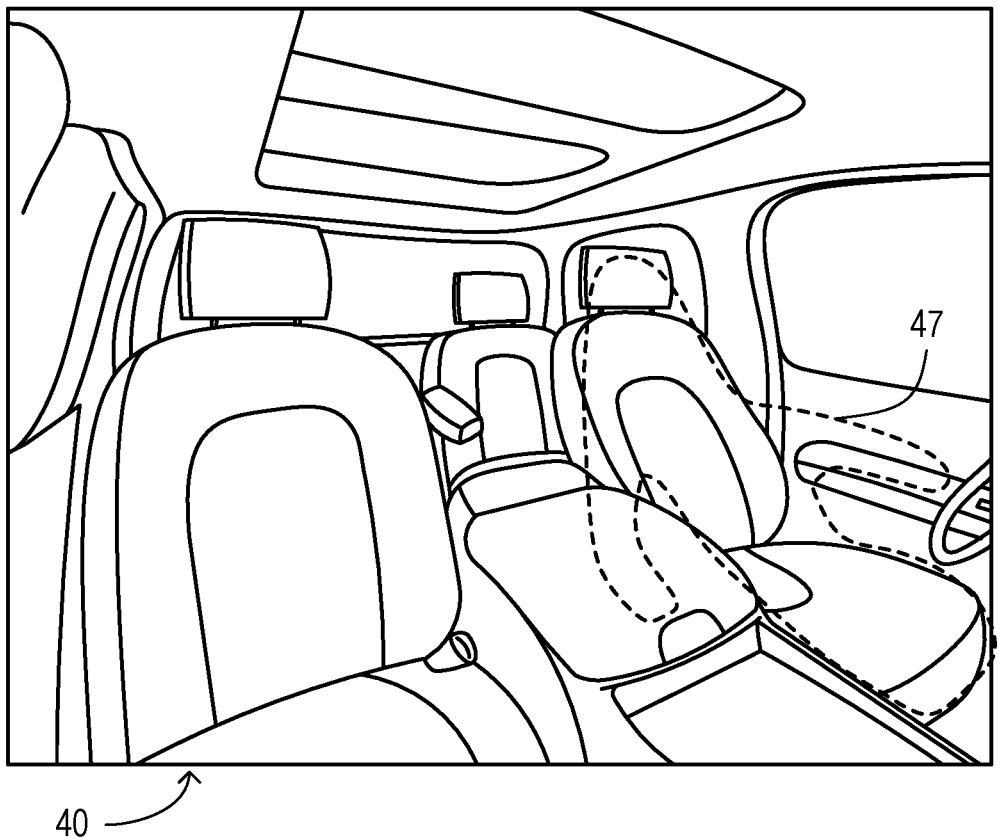
FIG. 4 schematically depicts a camera view within a vehicle passenger cabin with an occupant overlay.
Figure 5:
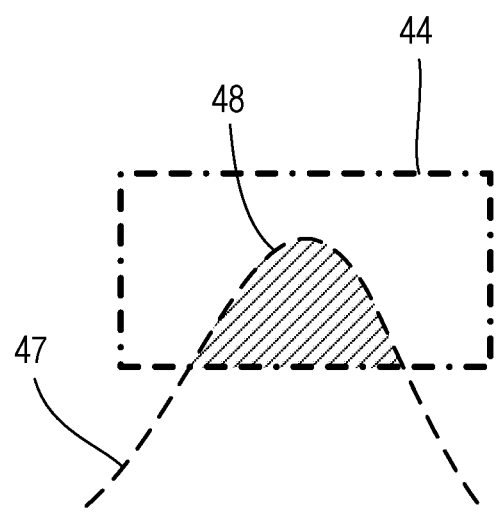
FIG. 5 depicts an overlap between an occupant overlay and an ROI overlay.

Returning to FIG. 2, selected image data which has been extracted from the full set of image data according to the ROI overlay(s) is passed to occupant overlay 31. It may be desirable to account for effects of the appearance of occupants within the ROI overlay(s) because they are dynamic and may interfere with the sunload profile accuracy. Occupants can be filtered out by object detection methods (e.g., pattern recognition and/or movement tracking) which may be trained for detecting humans and/or pets. Once an object is detected it is segmented out of the corresponding ROI(s). Thus, occupant overlay 31 is configured to detect a vehicle occupant represented in the selected image data and to generate truncated image data by subtracting image data corresponding to the vehicle occupant from the selected image data. As shown in FIG. 4, image data 40 is analyzed by the occupant overlay to detect a region 47 containing an occupant (e.g., person or pet). Occupant region 47 is compared with the ROI overlay(s) to detect any overlaps. As shown in FIG. 5, region 47 overlaps with ROI overlay region 44 at an intersection region 48. Region 48 is used to subtract corresponding image data from the selected image data for region 44, and the occupant overlay outputs truncated image data corresponding to the unobscured sections of the ROI overlay.

Accuracy of estimates of ambient light intensity within camera pixels may be improved by including information about the surfaces in the image. Accordingly, a material overlay can be used to provide material information such as color and reflectivity to be expected for each of the selected pixels in the ROI overlay(s). Raw intensity values can be compensation using parametric adjustments and/or using material/color based models which compensate for material differences. Returning again to FIG. 2, material overlay 32 defines a plurality of correction factors for surfaces in the predetermined scene elements based on light reflection properties of the constituent materials of the surfaces. Such correction factors are applied to truncated image data received from occupant overlay 31. The resulting values provide an array of measured ambient light values 33 which can be transferred to processing block 26 where they are used for generating the sunload map.

Figure 6:
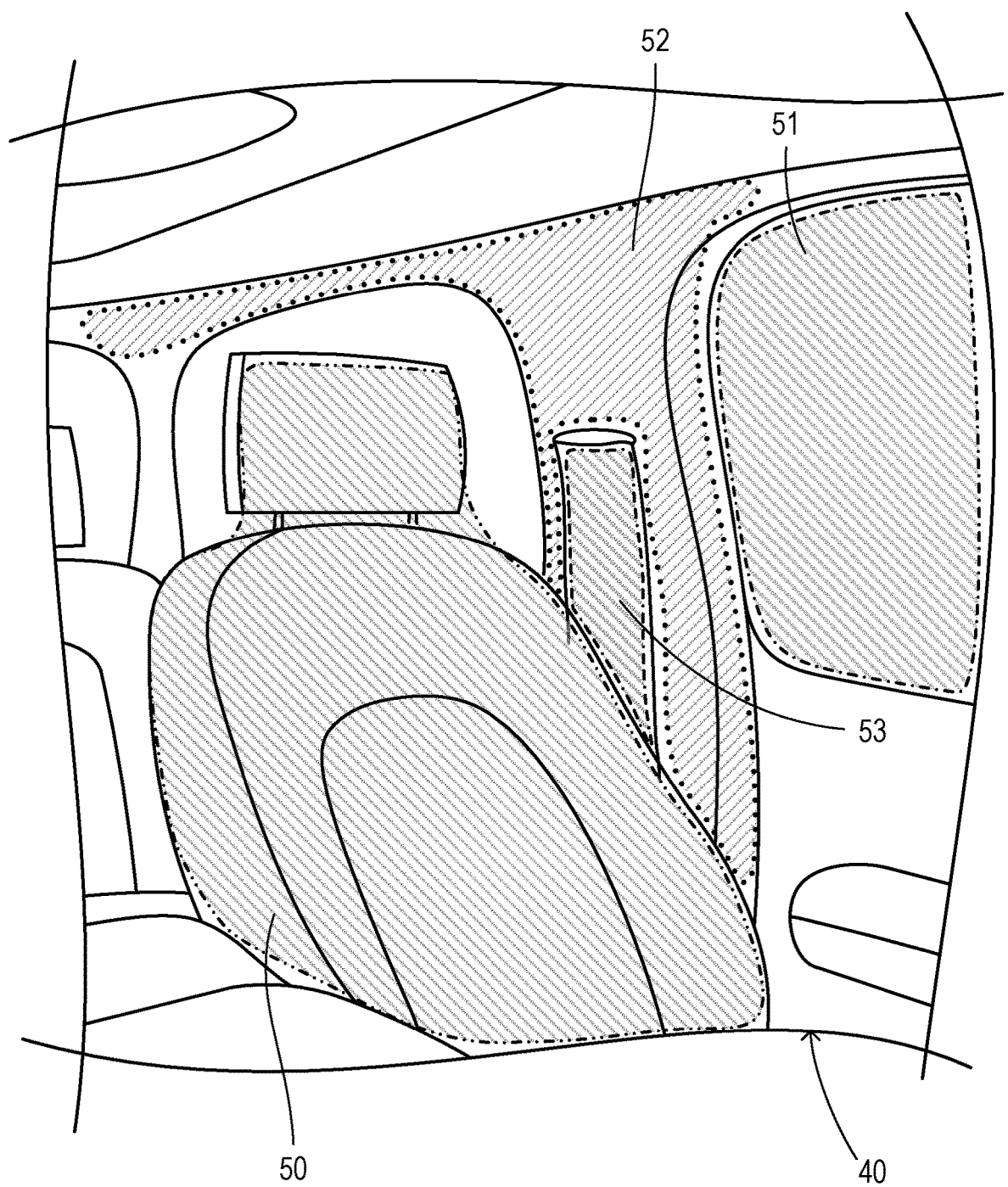
FIG. 6 schematically depicts a camera view within a vehicle passenger cabin with material overlays.

FIG. 6 shows regions of a material overlay superimposed a portion of image data 40. A material overlay region 50 corresponds to a seat-covering material, material overlay region 51 corresponds to a window/glass material, material overlay region 52 corresponds to an interior trim panel material, and material overlay region 53 corresponds to a seatbelt-webbing material. For each region, a respective correction may be applied based on the material properties. For example, correction factors may be defined according to the effects of the particular color or reflectivity which is characterized in advance according to the materials utilized for the specific vehicle make and model. The correction factors may also take into account the impact of existing environmental variables on the optical properties of the materials. Such environmental variables may include sun location or weather data which may be obtained as described below.

As a separate consideration, the present invention ensures validity of sunload values and refines the measured ambient light values according to an expected ambient light using various environmental parameters (e.g., extrinsically determined separate from the image data). Returning again to FIG. 2, such environmental parameters may preferably include a sun angle estimation, local weather predictions, and sun obstructions (e.g., shadows).

The sun position and relative angles with respect to the car can be calculated using a script using inputs 34 from the vehicle, such as the date, time-of-day, GPS location, and vehicle heading. An ephemeris or almanac in expected ambient light block 36 uses the date, time, and location data to determine the current sun position. The sun elevation and azimuth angles provide information on expected direct sunlight which can be used to create shadow maps. Sun angle dependent models can be built and used to specify an expected maximum intensity for direct sunlight. Local weather data 37 provides information on an expected reduction, if any, of the direct sunlight for the general area.

A sun obstruction block 38 may use exterior cameras to check for tunnels, trees, buildings, or traffic blocking the sun. This can be achieved by using conventional object detection and shadow detection techniques. An obstruction parameter, in conjunction with the local weather-modified solar intensity values provide an expected range within which the measured sunload values should fall. Processing block 26 receives the measured ambient light values and expected sunload range. Block 26 acts as a mapper which generates a sunload map comprising respective sunload values for a plurality of locations on the vehicle according to the truncated image data (with any correction factors resulting from material overlay 32) and potentially modified according to the expected sunload range. For example, a measured sunload value for a particular location in the sunload map which falls outside the expected sunload range for that particular location may be reset to a value within the expected range (or at least altered to be closer to the expected range).

The system of the invention may operate according to a method wherein image data is captured using an imaging system including at least one camera. The image data can includes a portion of a passenger cabin of the vehicle as well as exterior views. Selected image data is extracted from the image data which covers a region of interest (ROI). The ROI is defined according to predetermined scene elements of an environment of the vehicle. An occupant overlay is detected on-the-fly corresponding to selected image data that represents one or more vehicle occupants (human or pet). Truncated image data is generated by subtracting image data corresponding to the occupant overlay from the selected image data. In parallel, an expected sunload range is estimated using an ambient light model based on environmental parameters including a sun position. Finally, a sunload map is generated comprising respective sunload values for a plurality of locations on the vehicle according to the truncated image data and the expected sunload range.

For measuring the ambient light or sunload based on pixels in the image data, a plurality of correction factors may be determined according to a material overlay for surfaces in the predetermined scene elements. The correction factors may be based on light reflection properties of the constituent materials of the surfaces. The correction factors are applied to the truncated image data used for generating the sunload map.

When the sunload map is generated, preliminary sunload values may be determined for each of the plurality of locations according to pixel intensities within the truncated image data corresponding to the respective locations. The preliminary sunload values are compared with the corresponding expected sunload range. In response to the comparison, the sunload map values that are stored correspond to the preliminary sunload values if they fall in the corresponding expected sunload range. Otherwise, values within the expected sunload range may be stored when the preliminary sunload values do not fall in the corresponding expected sunload range.

Once the sunload map is generated, it becomes available for use by various vehicle system functions. For example, the vehicle may include an HVAC system for providing heating or cooling in the passenger cabin, and the HVAC system may include a controller which selects a heating or cooling operation according to the sunload map.

The foregoing invention replaces an ambient light sensor with onboard cameras. Using image data from the camera(s), estimates of sunload which is being received at various locations in the passenger cabin (e.g. by the driver and front passenger) or for exterior locations can be determined. The invention provides a profile of sunload measurements in and around the vehicle instead of measuring a single point as with the conventional ambient light sensor.

What is claimed is:

1. Apparatus for a vehicle with a passenger cabin, comprising:
   an imaging system including at least one camera capturing image data, wherein the image data includes at least a portion of the passenger cabin;

a region of interest (ROI) overlay receiving the image data and extracting selected image data according to predetermined scene elements of an environment of the vehicle;

an occupant overlay configured to detect a vehicle occupant represented in the selected image data and configured to generate truncated image data by subtracting image data corresponding to the vehicle occupant from the selected image data;

an ambient light model using environmental parameters including a sun position to estimate an expected sunload range; and a mapper generating a sunload map comprising respective sunload values for a plurality of locations on the vehicle according to the truncated image data and the expected sunload range.

2. The apparatus of claim 1 wherein the image data is comprised of pixel intensities.

3. The apparatus of claim 1 wherein the at least one camera is disposed in the passenger cabin, and wherein the predetermined scene elements include a window view to a vehicle exterior and an interior trim surface.

4. The apparatus of claim 1 wherein the occupant overlay detects the vehicle occupant by applying pattern recognition to the image data.

5. The apparatus of claim 1 further comprising:
a material overlay defining a plurality of correction factors for surfaces in the predetermined scene elements based on light reflection properties of constituent materials of the surfaces, wherein the correction factors are applied to the truncated image data used for generating the sunload map.

6. The apparatus of claim 1 wherein the environmental parameters further include weather conditions.

7. The apparatus of claim 1 wherein the environmental parameters further include shadows impacting the image data.

8. The apparatus of claim 1 wherein the sun position is comprised of a sun angle with respect to an orientation of the vehicle.

9. The apparatus of claim 1 wherein the mapper generates the sunload map by 1) determining preliminary sunload values for each of the plurality of locations according to pixel intensities within the truncated image data corresponding to the respective locations, 2) comparing the preliminary sunload values with a corresponding expected sunload range, and 3) storing the sunload map according to (i) preliminary sunload values that fall in the corresponding expected sunload range and (ii) expected values in the expected sunload range for preliminary sunload values that do not fall in the corresponding expected sunload range.

10. The apparatus of claim 1 further comprising:
an HVAC system for providing heating or cooling in the passenger cabin;
wherein the HVAC system includes a controller wherein a selected heating or cooling operation is adjusted according to the sunload map.

11. A method for adjusting operation of apparatus in a vehicle using a sunload map, comprising the steps of:
capturing image data using an imaging system including at least one camera, wherein the image data includes at least a portion of a passenger cabin of the vehicle;

extracting selected image data covering a region of interest (ROI) from the image data, wherein the ROI is defined according to predetermined scene elements of an environment of the vehicle;

detecting an occupant overlay corresponding to selected image data that represents a vehicle occupant;

generating truncated image data by subtracting image data corresponding to the occupant overlay from the selected image data;

estimating an expected sunload range using an ambient light model based on environmental parameters including a sun position; and generating a sunload map comprising respective sunload values for a plurality of locations on the vehicle according to the truncated image data and the expected sunload range.

12. The method of claim 11 wherein the image data is comprised of pixel intensities.

13. The method of claim 11 wherein the at least one camera is disposed in the passenger cabin, and wherein the predetermined scene elements include a window view to a vehicle exterior and an interior trim surface.

14. The method of claim 11 wherein the step of detecting an occupant overlay is comprised of applying pattern recognition to the image data.

15. The method of claim 11 further comprising the steps of:
determining a plurality of correction factors according to a material overlay for surfaces in the predetermined scene elements that defines the correction factors based on light reflection properties of constituent materials of the surfaces; and
applying the correction factors to the truncated image data used for generating the sunload map.

16. The method of claim 11 wherein the environmental parameters further include weather conditions.

17. The method of claim 11 wherein the environmental parameters further include shadows impacting the image data.

18. The method of claim 11 wherein the sun position is comprised of a sun angle with respect to an orientation of the vehicle.

19. The method of claim 11 wherein generating the sunload map is comprised of:
determining preliminary sunload values for each of the plurality of locations according to pixel intensities within the truncated image data corresponding to the respective locations;
comparing the preliminary sunload values with a corresponding expected sunload range; and
storing the sunload map according to (i) preliminary sunload values that fall in the corresponding expected sunload range and (ii) expected values in the expected sunload range for preliminary sunload values that do not fall in the corresponding expected sunload range.

20. The method of claim 11 wherein the vehicle includes an HVAC system for providing heating or cooling in the passenger cabin, and wherein the HVAC system includes a controller, the method further comprising the step of:
selecting heating or cooling operation according to the sunload map.

* * * * *